UNITED STATES PATENT OFFICE.

JOHN T. DAVIS, OF ALAMEDA, CALIFORNIA, ASSIGNOR TO TECHNICAL DEVELOPMENT CO., OF SAN FRANCISCO, CALIFORNIA, A CORPORATION OF ARIZONA.

METHOD OF UTILIZING GARBAGE.

1,054,282.  Specification of Letters Patent.  Patented Feb. 25, 1913.

No Drawing.  Application filed April 17, 1911.  Serial No. 621,685.

*To all whom it may concern:*

Be it known that I, JOHN T. DAVIS, a citizen of the United States, residing at Alameda, in the county of Alameda and State of California, have invented new and useful Improvements in Methods of Utilizing Garbage, of which the following is a specification.

My invention relates to a method of treating garbage and other waste material whereby I recover several important commodities of commercial value, as alcohol, fertilizers, and lubricating oil.

The garbage, as it is collected, consists of all kinds of vegetables, farinaceous compounds, scraps of meat, and small bones. In this condition it is dumped into a mash tub, having arms or stirrers connected to a shaft, and provided with steam connections. In said tub it is cooked and stirred with about three per cent. of sulfuric acid diluted with water, until all the starch present is converted into glucose. The mass is then transferred into a settling tank, having a false bottom, which allows the glucose to drain into another tank. In this latter tank the acid is neutralized by carbonate of lime or crude soda, and the liquid is run into fermenting tanks, and after fermentation the liquid is distilled and the alcohol recovered by condensation. The protein compounds left in the settling tanks are removed, and, with the small bones, are put through a crushing and mixing process. While this is taking place the sulfate of lime left in the neutralizing tank is added gradually to the mass, and if the product is not sufficiently rich in nitrogen, the necessary quantity of chlorid of ammonia is added to bring its fertilizing value up to a commercial standard. To the fertilizer in addition to the sulfate of lime may be added infusorial earth, wood ashes, and sal-ammoniac. The oil in the garbage, consisting of various kinds of grease such as butter, lard, cotton seed oil, and the like, have undergone a refining process by oxidization by hot sulfuric acid, is gathered from the glucose just before the act of fermentation begins, as it is then found at the top of the menstruum. This oil is found to be of a limpid and fluid character and with a non-drying quality which renders it useful as a lubricating oil for the most delicate mechanism.

I have found by experiments that, when waste potatoes are added for making alcohol, the addition of the kitchen garbage to a small per cent. of potatoes increases the yield of alcohol by removing the empyreumatic oil of the potato, since the latter unites with the grease of the garbage and is removed before fermentation sets in.

In this process, I do not confine myself to the use of garbage, for the same process is applicable to sugar beets, sorghum stocks, corn cobs and stock, and other articles that have a cellulose base.

I claim:—

The method of producing glucose, fertilizer, and lubricating oils from material such as kitchen garbage, which consists in heating said material with an acid, which, in a hot state, has a high oxidizing power, separating the liquid and solid constituents of the mixture, neutralizing the excess of acid in said liquid constituents by the addition of a neutralizing substance, separating from the liquid the salt thus obtained, grinding the separated solids left after the treatment with sulfuric acid, and adding said salt to said ground solids.

In testimony whereof I have hereunto set my hand in the presence of two subscribing witnesses.

JOHN T. DAVIS.

Witnesses:
  FRANCES M. WRIGHT,
  D. B. RICHARDS.